Aug. 6, 1968   E. J. J. BENARD   3,396,002

PASTE MOLD WITH EVAPORATION GROOVES

Filed Sept. 15, 1964

United States Patent Office 3,396,002
Patented Aug. 6, 1968

3,396,002
PASTE MOLD WITH EVAPORATION GROOVES
Emil Jan Johan Benard, Leerdam, Netherlands, assignor to N.V. Vereenigde Glasfabrieken (United Glassworks), Schiedam, Netherlands
Filed Sept. 15, 1964, Ser. No. 396,695
Claims priority, application Netherlands, Sept. 20, 1963, 298,205
2 Claims. (Cl. 65—267)

ABSTRACT OF THE DISCLOSURE

Glass articles are blown in a paste lined mold which is treated with water which provides a steam cushion during the molding operation. The water and mold are maintained at temperatures which assure that the evaporation of the water between the spraying and molding operations will not be sufficient to prevent an appreciable cushion of steam, the exterior of the mold being cooled by evaporating water.

---

The invention relates to a method of blowing glass articles in paste molds, wherein the mold first is treated with cooling water and is brought into blowing position with the water adhering to it to provide cooling.

In the past, it has been usual to blow out a glass gob, arranged at the end of a blowing pipe, while rotating it in a female mold which has on its inner surface a layer of paste. This paste layer contains a great percentage of coal, and is baked upon the wall of the mold. There are various compositions of such paste in comon use but in each case their purpose is to form a porous layer, which can absorb water, so that when the hot glass is brought into the mold, a steam cushion will be produced between the glass and the mold. This steam cushion will make for a specular seamless surface on the article.

Moreover by this steam layer it is obtained that the blank rotates smoothly in the mold and inconvenient torsion effects are avoided.

The nature of this steam cushion has great influence on the formation of disfiguring ring shaped lines, which occur often on the outer surface of blown glass. The presence and size of these rings constitutes an important factor in judging the quality of the articles produced.

The principal object of the invention, which is based upon extensive research concerning this phenomenon, is to influence the nature, regularity and maintenance of said steam cushion so that a considerable improvement of quality, and rate of production can be attained, especially as regards avoiding the said ringshaped lines.

Other objects of the invention will appear from the following detailed description, with reference to the drawing. In the drawing.

One can imagine that the temperature of the molds during the production process is influenced by the rate frequency of use for blowing out a blank, the amount of glass in the blank and the temperatures thereof at its introduction into the mold and at leaving it (as the difference dictates the amount of heat which must be absorbed by the mold), and further the heat capacity of the mold itself. The latter has been predetermined for the most part, because the shape and the size are determined by the nature of the mold cavity and by the requirements as to exterior shape and weight to fulfill the condition for handling the mold in mechanical glass manufacture. Further the possibility of influencing the temperature by the cooling period, during which the mold is sprayed at the inside and outside with water, or eventually dipped into it, is limited, because the time available for it is mainly determined by the requirements of the production process.

Up to now one could at most establish that for example in case of fast successive use of the mold or in general at a long drying time in relation to the rinsing time in the production process, the molds were too dry each time after blowing out a blank. One could then try to give the mold a longer production cycle at the cost of the production capacity.

In the method according to the invention just the opposite approach is taken. One must be able to direct the cycle of use of the mold entirely according to the maximum production which can be attained with a mold, in view of the properties of the machine and the maximum working rate of the various operations. A rule is given by the method according to the invention, so that one will have the assurance that glass articles of high quality are obtained.

Figure 1:
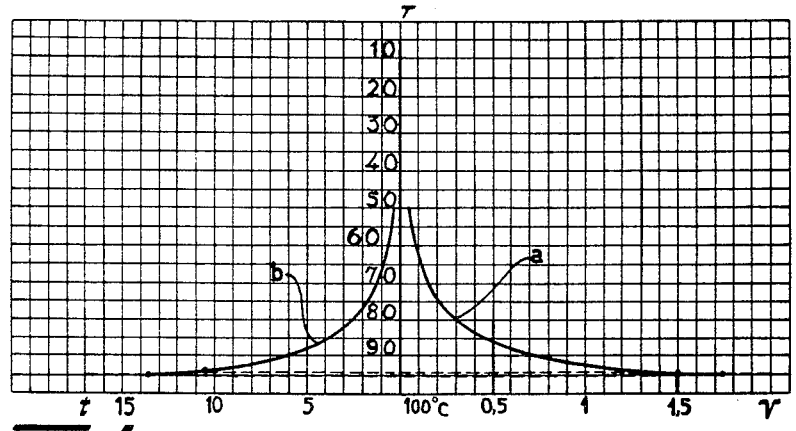
FIG. 1 shows a diagram for explanation of the invention.

In the diagram of FIG. 1 the curve $a$ at the right hand side shows approximately the relation between the amount of water V (on the horizontal axis to the right) which evaporates per square dm area of the mold per minute, and the temperature T of the water which is present on the mold (indicated along the vertical axis).

At the left hand side of the figure a curve $b$ has been drawn which indicates approximately how many degrees the difference $t$ (indicated on the horizontal axis to the left) between the temperature of the mold and the temperature of the water present on the mold must be, in order to have, for any point of the curve $a$ (so at various evaporation rates), the required evaporation heat flow from the mold to the water, to obtain equilibrium.

The allowable limits for the evaporation rates of the water of the paste layer are determined as follows. The paste layer contains about 1.5 grammes of water per square dm. Approximately 20 seconds transpire between the moment at which the mold leaves the position wherein it is sprayed and the moment at which the blank touches the mold during this period the paste layer cannot lose much more than ⅓ of its water content by evaporation, not much more than 0.5 gramme of water per square dm., in order that sufficient water will remain in the paste layer to be able to form a steam cushion during the entire blowing operation. Thus one arrives at a maximum allowable evaporation rate of 1.5 grammes per square dm. of paste layer area per minute. From FIG. 1 it appears that the evaporation rate of 1.5 grammes per square dm. per minute corresponds to a water temperature of about 94° C., and a temperature difference between mold and water of about 11° C. It must be assured therefore that enough heat is withdrawn from the mold at its exterior so that its temperature will not rise appreciably above 105° C. The lower limit of the temperature difference which induces sufficient heat transfer from the mold is about 5° C., which corresponds to an evaporation rate of 0.5 gramme per square dm. per minute.

Preferably the temperature difference between the mold and the water in the paste layer is maintained at about 10° C., which corresponds to an evaporation rate of between 1 and 1.5 grammes per square dm. per minute.

In many cases one would be able to obtain limitation of the mold temperature by cooling to a very low temperature during the spraying period, but this leads to a lengthening of the spraying time, and therefore to a decrease of the production capacity. The best results are obtained when the temperature of the water in the paste layer is kept below about 95° C.

According to the invention, therefore one provides a water reserve on the outer surface of the mold, which by evaporation during the whole production cycle from leaving the spraying position to the introduction of the next spraying position, will take care of a sufficient withdrawal of heat. As the temperature tends to become higher the evaporation of this water will increase, so that more heat is withdrawn from the mold and a compensating action is present.

A premature evaporation of the amount of water absorbed in the paste layer can not occur, even when the time during which the blow-mold is cooled at the inside and outside by water, is unfavourable with respect to the drying time, i.e. the time for transport from the cooling position to the blowing position and the blowing time of the glass in the mold. One obtains thus, that in the paste layer by the end of the blowing of the blank sufficient water is still present, in order that the steam layer during the whole cycle of treatment in the mold keeps its regular character.

The usual paste-molds, which are cooled by spraying water or by dipping, do not lend themselves generally to application of the invention, because in such molds the evaporation of water adhering after rinsing plays a role which will take a pretty arbitrary course.

Figure 2:
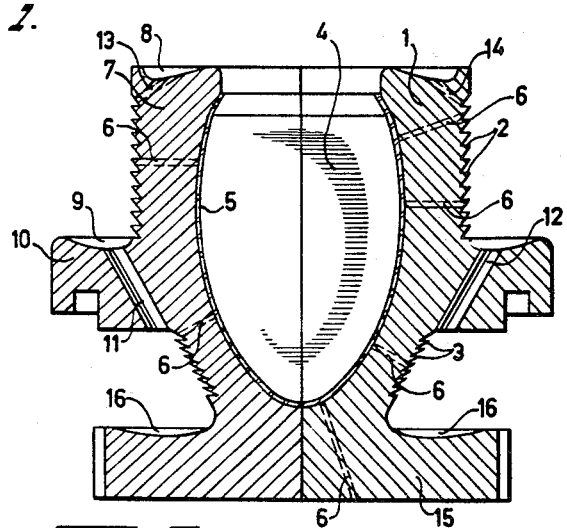
FIG. 2 shows in vertical section an embodiment of a paste mold made in accordance with the present invention.

A mold which lends itself pre-eminently for applying the method according to the invention is represented in FIG. 2.

The mold body 1 represented in this figure has an inner mold cavity 4, and outer ring shaped grooves 2 and 3.

After rinsing the mold, a water reserve will remain in these ring grooves, to provide water for evaporation from the end of one spraying operation until the beginning of the following spraying operation to take care of the requisite withdrawal of heat from the mold 1, sufficient to keep the temperature of the mold low enough so that the paste layer 5 loses little water by evaporation before the blank is introduced in the mold, so that this paste layer, during the whole portion of the process from the introduction of the blank until the removal of the parison, produces a steam cushion of the desired nature between the glass surface and the inner surface of the mold.

The mold is provided in the usual manner with borings 6, divided regularly in the wall, which constitute air outlet openings during blowing and through which also steam may be discharged, which is in excess of that necessary to maintain a steam cushion along the whole inner surface.

As shown in FIG. 2 the upper surface of the ring grooves 2 and 3 are substantially horizontal, but they may slope inwardly and downwardly so that each ring constitutes a trough, extending around the mold.

The cooling function of these ring grooves can be enhanced, not only by increasing their number, and modifying their shape and location, but for practical applications examples are shown in the drawing. In the upper edge 7 of the broad mold 1, a larger trough shaped ring groove 8 has been provided. It has the same cooling function as the ring grooves 2 and 3. Further a similar trough 9 in the lower flange 10 of the mold 1 is provided. Such a flange per se is not new. In many molds it is present for mechanical handling purposes.

From the bottom of the trough 9 borings 11 and 12 extend downwardly to the uppermost of the ring grooves 3, which are arranged about the circumference of the mold 1, and inwardly of the flange 10. By giving appropriate dimensions to the trough 9 and to the borings 11 and 12, the ring grooves 3 are fed with water from the trough 9. This is of importance when during spraying the rings 3 are covered by the mold engaging means. Moreover one can assure that the ring grooves 3 stay always wet when using the mold, although water disappears by evaporation, because water is supplied from the trough 9. Similar borings 13 and 14 extend downwardly from the ring groove 8 in the upper edge 7 in order to feed the ring grooves 2.

Finally in the upper face of the foot 15 of the mold is a shallow trough shaped ring groove 16 to provide another water reserve on an evaporation surface.

Figure 3:
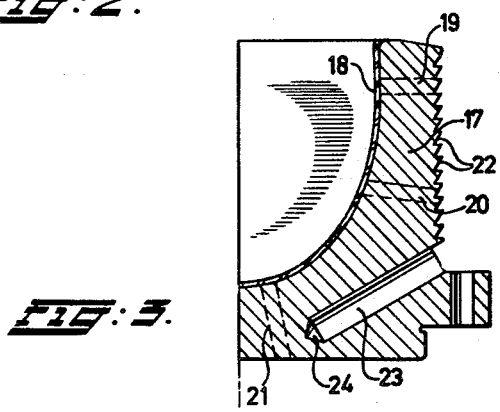
FIG. 3 shows in similar manner another embodiment of such a paste mold.

The embodiment according to FIG. 3 shows a mold 17 which is intended for example for blowing the body of a cocktail glass. The paste layer is indicated by 18 and air outlet openings by 19, 20 and 21. About the circumference of the mold are ring grooves 22, and in the thicker foot portion of the mold are downwardly and inwardly extending borings 23, which, as indicated at 24, end in the material of the mold. During the rinsing of the mold these borings 23 are filled with water, constituting part of the water reserve which is required for the purpose of withdrawing heat from the mold by evaporation at the outside thereof.

It is clear that in dividing the evaporation surface over the outer surface of the mold it is advantageous to provide greater evaporation area at places on the mold where the blank will transfer the most heat energy. This can be done by providing more grooves per unit length of the mold at such locations on the mold body.

The description has been given with reference to the drawings of some embodiments. Various modifications may be made within the spirit of the invention. Therefore, I do not want the scope of the invention to be limited, further than it is limited by the following claims.

What I claim is:

1. A mold for blowing a glass article comprising a mold body, a cavity (4) within said body corresponding to the shape of said article, a plurality of ring grooves (2, 3) on the outer surface of said mold body and in communication with the atmosphere, said ring grooves being closer together at locations (3) on said mold where comparatively large amounts of heat are transferred to said mold from said article than at locations (2) where comparatively little heat is transferred to said mold by said article, a trough (8) on the outer surface of said body, a boring (14) extending downwardly from said trough and terminating over the uppermost of said ring grooves, said grooves being adapted to hold water to evaporate to cool said mold and said troughs adapted to hold additional water which falls upon said ring groove through said boring to replenish water evaporated from said ring grooves.

2. The mold defined in claim 1 wherein there are two groups of ring grooves and further comprising a second trough to replenish water evaporated from said second set of ring grooves.

References Cited

UNITED STATES PATENTS

| | | | |
|---|---|---|---|
| 1,294,319 | 2/1919 | Stewart | 65—267 |
| 1,531,415 | 3/1925 | Said | 65—356 |
| 2,269,553 | 1/1942 | Roessler | 65—265 |
| 2,289,999 | 7/1942 | Schutz | 65—355 |
| 3,129,089 | 4/1964 | Torok | 65—319 |
| 3,203,777 | 8/1965 | Berry et al. | 65—267 |
| 3,224,860 | 12/1965 | Stinnes | 65—319 |
| 2,243,194 | 5/1941 | Cook | 65—24 XR |
| 3,254,981 | 6/1966 | Havens | 65—169 XR |

FOREIGN PATENTS 598,582    5/1925    France.

DONALL H. SYLVESTER, *Primary Examiner.*

F. W. MIGA, *Assistant Examiner.*